US012618477B2

(12) United States Patent (10) Patent No.: US 12,618,477 B2
Shakudo (45) Date of Patent: May 5, 2026

(54) FLUID CONTROL VALVE, FLUID CONTROL DEVICE, AND FLUID CONTROL VALVE MANUFACTURING METHOD

(71) Applicant: HORIBA STEC, Co., Ltd., Kyoto (JP)

(72) Inventor: Kazuya Shakudo, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 18/852,129

(22) PCT Filed: Mar. 27, 2023

(86) PCT No.: PCT/JP2023/012107
§ 371 (c)(1),
(2) Date: Sep. 27, 2024

(87) PCT Pub. No.: WO2023/203969
PCT Pub. Date: Oct. 26, 2023

(65) Prior Publication Data
US 2025/0207669 A1 Jun. 26, 2025

(30) Foreign Application Priority Data

Apr. 21, 2022 (JP) ................................. 2022-070218

(51) Int. Cl.
*F16K 1/54* (2006.01)
*F16K 1/34* (2006.01)
(Continued)

(52) U.S. Cl.
CPC .................. *F16K 1/42* (2013.01); *F16K 1/34* (2013.01); *F16K 1/36* (2013.01); *F16K 1/38* (2013.01);
(Continued)

(58) Field of Classification Search
CPC . F16K 1/42; F16K 1/54; F16K 37/005; F16K 1/36; F16K 1/38; F16K 25/005;
(Continued)

(56) References Cited

U.S. PATENT DOCUMENTS 2,595,012 A * 4/1952 Smith ........................ F16K 1/36
251/332
2,924,233 A * 2/1960 Michaels ................ F16K 41/12
137/315.27
(Continued)

FOREIGN PATENT DOCUMENTS

JP S6275180 A * 4/1987
JP 2000322129 A 11/2000
(Continued)

OTHER PUBLICATIONS

ISA Japan Patent Office, International Search Report Issued in Application No. PCT/JP2023/012107, Jun. 13, 2023, WIPO, 4 pages.

*Primary Examiner* — Marina A Tietjen
(74) *Attorney, Agent, or Firm* — Alleman Hall LLP

(57) ABSTRACT

The present invention improves the sealability of a fluid control valve, and includes a valve seat having a flat valve seat surface and a valve plug having a flat sitting surface sitting on the valve seat surface. A first surface that is one of the valve seat surface and the sitting surface has a surface hardness higher than a surface hardness of a second surface that is the other one of the valve seat surface and the sitting surface.

7 Claims, 6 Drawing Sheets

(51) Int. Cl.

| | | |
|---|---|---|
| *F16K 1/36* | (2006.01) | |
| *F16K 1/38* | (2006.01) | |
| *F16K 1/42* | (2006.01) | |
| *F16K 25/00* | (2006.01) | |
| *F16K 31/00* | (2006.01) | |
| *F16K 37/00* | (2006.01) | |

(52) U.S. Cl.
CPC .............. *F16K 1/54* (2013.01); *F16K 25/005* (2013.01); *F16K 31/007* (2013.01); *F16K 37/005* (2013.01)

(58) Field of Classification Search
CPC .......... F16K 1/34; F16K 25/00; F16K 31/007; B24B 15/04; B24B 39/06
See application file for complete search history.

(56) References Cited

U.S. PATENT DOCUMENTS

| | | | | |
|---|---|---|---|---|
| 4,582,294 A | * | 4/1986 | Fargo .................. | F16K 31/0641 251/282 |
| 5,722,638 A | * | 3/1998 | Miller ..................... | F16K 37/00 251/266 |
| 2019/0072189 A1 | * | 3/2019 | Vu ............................ | F16K 1/44 |

FOREIGN PATENT DOCUMENTS

| | | | | |
|---|---|---|---|---|
| JP | 2011027180 A | | 2/2011 | |
| JP | 2017020533 A | | 1/2017 | |
| JP | 2018155278 A | | 10/2018 | |
| KR | 20180020302 A | * | 2/2018 | ............. F16K 41/12 |

* cited by examiner

DIRECTION FOR
CLOSING VALVE

DIRECTION FOR
OPENING VALVE

FLUID CONTROL VALVE, FLUID CONTROL DEVICE, AND FLUID CONTROL VALVE MANUFACTURING METHOD

TECHNICAL FIELD

The present invention relates to a fluid control valve, a fluid control device, and a method of manufacturing a fluid control valve.

BACKGROUND ART

Conventionally, as disclosed in Patent Literature 1, there has been some fluid control valve that controls a fluid by causing a flat sitting surface to sit and to separate from a flat valve seat surface.

However, such a fluid control valve suffers from seat leakage (leakage while the valve is fully closed), as a result of long-term use. Some causes of such seat leakage include the sitting surface or the valve seat surface becoming damaged and deteriorated as a result of the sitting surface and the valve seat surface coming into uneven contact with each other repeatedly, or corrosion causing the valve seat surface or the sitting surface to roughen.

CITATION LIST

Patent Literature

Patent Literature 1: JP 2000-322129 A

SUMMARY OF INVENTION

Technical Problem

Therefore, the present invention has been made in consideration of the problem described above, and a main object of the present invention is to improve the sealability of the fluid control valve.

Solution to Problem

That is, a fluid control valve according to the present invention includes: a valve seat having a valve seat surface that is flat and a valve plug having a sitting surface that is flat and that sits on the valve seat surface, in which a first surface that is one of the valve seat surface and the sitting surface has a surface hardness higher than a surface hardness of a second surface that is the other one of the valve seat surface and the sitting surface.

In such a fluid control valve, because the first surface that is one of the valve seat surface and the sitting surface has a surface hardness higher than a surface hardness of the second surface which is the other one of the valve seat surface and the sitting surface, a hardness difference is ensured between the valve seat surface and the sitting surface so that the sealability can be improved. In addition, because the flat sitting surface is seated on the flat valve seat surface, a variation in the contact position between the sitting surface and the valve seat surface can be tolerated, and therefore, the sealability can be improved. Furthermore, because both of the valve seat surface and the sitting surface are flat, surface hardening processing for enhancing the hardness (e.g., burnishing processing) can be easily applied to one of the valve seat surface and the sitting surface. The burnishing processing is processing for increasing the surface hardness by pressing a tool (burnishing tool) made of a highly hard material against a workpiece having a rough surface resultant of cutting processing, to smooth out the surface of the workpiece by plastic deformation.

Preferably, the first surface has an area larger than an area of the second surface. In other words, the first surface with a larger area has a surface hardness higher than that of the second surface with a smaller area. This is because the first surface having a larger area is more likely to become damaged, as a result of an edge of the second surface with a smaller area coming into contact therewith, for example.

Because the valve plug is a movable member driven by a driving mechanism, the sitting surface comes into contact with a position offset from the valve seat surface that is fixed. At this time, from the viewpoint of improving the durability of the valve plug, it is desirable to provide the sitting surface with a surface hardness higher than a surface hardness of the valve seat surface. For this reason, the first surface is preferably the sitting surface, and the second surface is preferably the valve seat surface.

Furthermore, the fluid control device according to the present invention includes a driving mechanism having a driving member that comes into contact with the valve plug and drives the valve plug. The valve plug preferably has the sitting surface and a driving force acting surface that comes into contact with the driving member, and a surface hardness of the driving force acting surface is preferably higher than a surface hardness of the contact surface of the driving member that comes into contact with the valve plug.

Preferably, the valve plug has a groove provided adjacently to the sitting surface. As the sitting surface of the valve plug is subjected to the burnishing processing, extra material is formed as a result of being pushed in the burnishing processing. With this extra material going into the groove provided adjacently to the sitting surface, it is possible to prevent the extra material from impairing the sealability.

Furthermore, a fluid control device according to the present invention includes the fluid control valve described above; a fluid sensor that measures a flow rate or a pressure of a fluid; and a control unit that controls a degree by which the fluid control valve is opened, based on a measurement measured by the fluid sensor, and based on a setting.

Furthermore, a method of manufacturing a fluid control valve according to the present invention is a method of manufacturing a fluid control valve including a valve seat having a valve seat surface that is flat and a valve plug having a sitting surface that is flat and that sits on the valve seat surface, the method includes applying burnishing processing to make a surface hardness of one of the valve seat surface and the sitting surface higher than a surface hardness of the other one of the valve seat surface and the sitting surface.

Advantageous Effect of Invention

According to the present invention described above, it is possible to improve the sealability of a fluid control valve.

DESCRIPTION OF EMBODIMENTS

Figure 1:
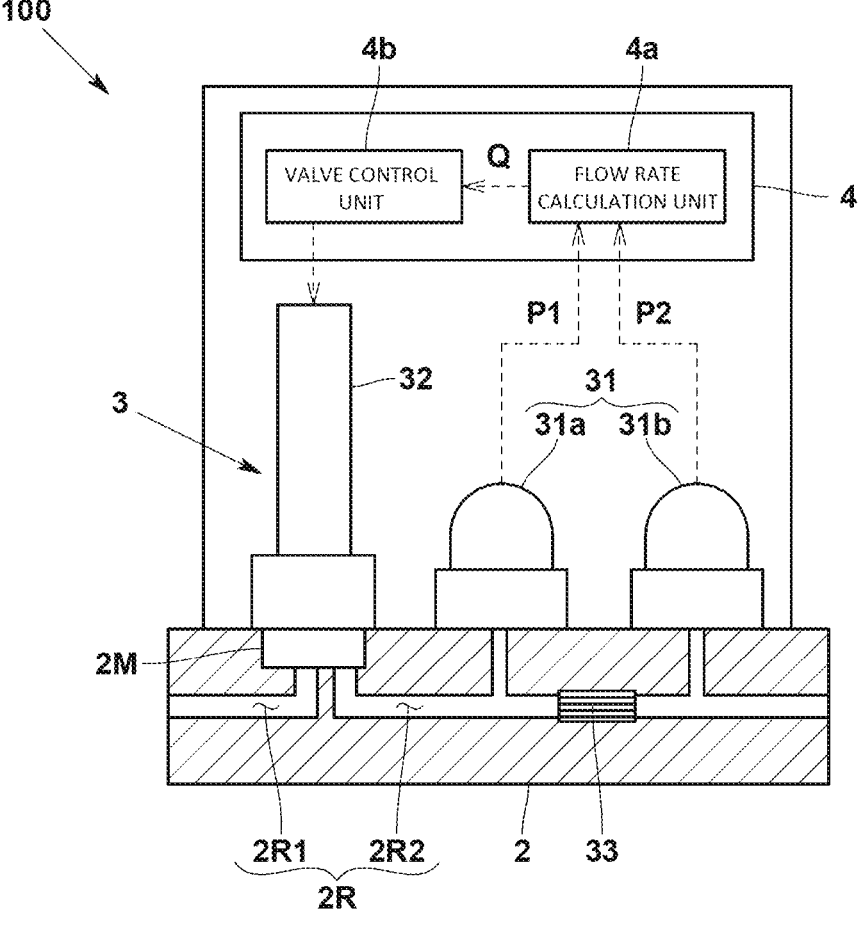
FIG. 1 is a diagram schematically illustrating a configuration of a fluid control device according to one embodiment of the present invention.

A fluid control device according to one embodiment of the present invention will now be explained with reference to some drawings. Note that, to facilitate understanding, all of the drawings described below are schematic representations, with some omissions and exaggerations made as appropriate. The same elements are denoted by the same reference numerals, and the descriptions thereof will be omitted as appropriate.

<Device Configuration>

This fluid control device 100 according to the present embodiment is incorporated in a semiconductor manufacturing device, for example, and used in a semiconductor manufacturing processing. The fluid control device 100 is provided, as an example, to one or more gas supply lines that are connected to a semiconductor processing chamber, so as to control the flow rate of a process gas flowing through each of the gas supply lines.

Specifically, the fluid control device 100 is a what is called a differential pressure mass flow controller (differential pressure MFC), and includes a channel block 2 having an internal channel 2R, and a fluid controller 3 including a flow rate sensor 31 and a fluid control valve 32 mounted on the channel block 2, as illustrated in FIG. 1.

The channel block 2 has a rectangular shape, and the flow rate sensor 31 and the fluid control valve 32 are installed on a predetermined surface. In addition, the channel block 2 has a predetermined surface provided with a recessed housing portion 2M for installing the fluid control valve 32. This housing portion 2M divides the internal channel 2R into an upstream channel 2R1 and a downstream channel 2R2. One end of the upstream channel 2R1 opens to the bottom surface of the housing portion 2M, and one end of the downstream channel 2R2 opens to an inner surface of the housing portion 2M.

The fluid controller 3 controls the fluid through the internal channel 2R, and includes the flow rate sensor 31 for measuring the flow rate of the fluid flowing through the internal channel 2R, and the fluid control valve 32 provided upstream of the flow rate sensor 31. The degree by which the fluid control valve 32 is opened is feedback-controlled by the control unit 4, to described later.

The flow rate sensor 31 is a differential pressure flow rate sensor, and includes an upstream pressure sensor 31a provided upstream of a fluid resistance element 33 such as a restrictor or an orifice provided inside the internal channel 2R, and a downstream pressure sensor 31b provided downstream of the fluid resistance element 33. The upstream pressure sensor 31a and the downstream pressure sensor 31b are mounted on a predetermined surface of the channel block 2, in line with the fluid control valve 32. A flow rate calculation unit 4a included in the control unit 4, to described later, then calculates a flow rate Q flowing through the internal channel 2R, using an upstream-side pressure P1 upstream of the fluid resistance element 33, detected by the upstream pressure sensor 31a and a downstream-side pressure P2 downstream of the fluid resistance element 33, detected by the downstream pressure sensor 31b.

The fluid control valve 32 is provided upstream of the differential pressure flow rate sensor 31. Specifically, the fluid control valve 32 controls the flow rate by advancing and retracting the valve plug with respect to the valve seat, using a piezoelectric actuator. In the present embodiment, the valve plug is what is called a normally closed valve plug that is fully closed while the valve plug is not driven. The fluid control valve 32 is controlled by a valve control unit 4b included in the control unit 4. A detailed configuration of the fluid control valve 32 will be described later.

The control unit 4 includes a flow rate calculation unit 4a that calculates the flow rate Q flowing through the internal channel 2R, on the basis of the upstream-side pressure P1 and the downstream-side pressure P2, and a valve control unit 4b that controls the fluid control valve 32 on the basis of the flow rate Q calculated by the flow rate calculation unit 4a and a target flow rate (setting). Note that the control unit 4 is what is called a computer including a CPU, a memory, an A/D and D/A converter, and an input/output unit, for example, and functions as the flow rate calculation unit 4a, the valve control unit 4b, and the like, by executing a flow rate control program stored in the memory and cooperating with various devices.

<Detailed Configuration of Fluid Control Valve 32>

Figure 2:
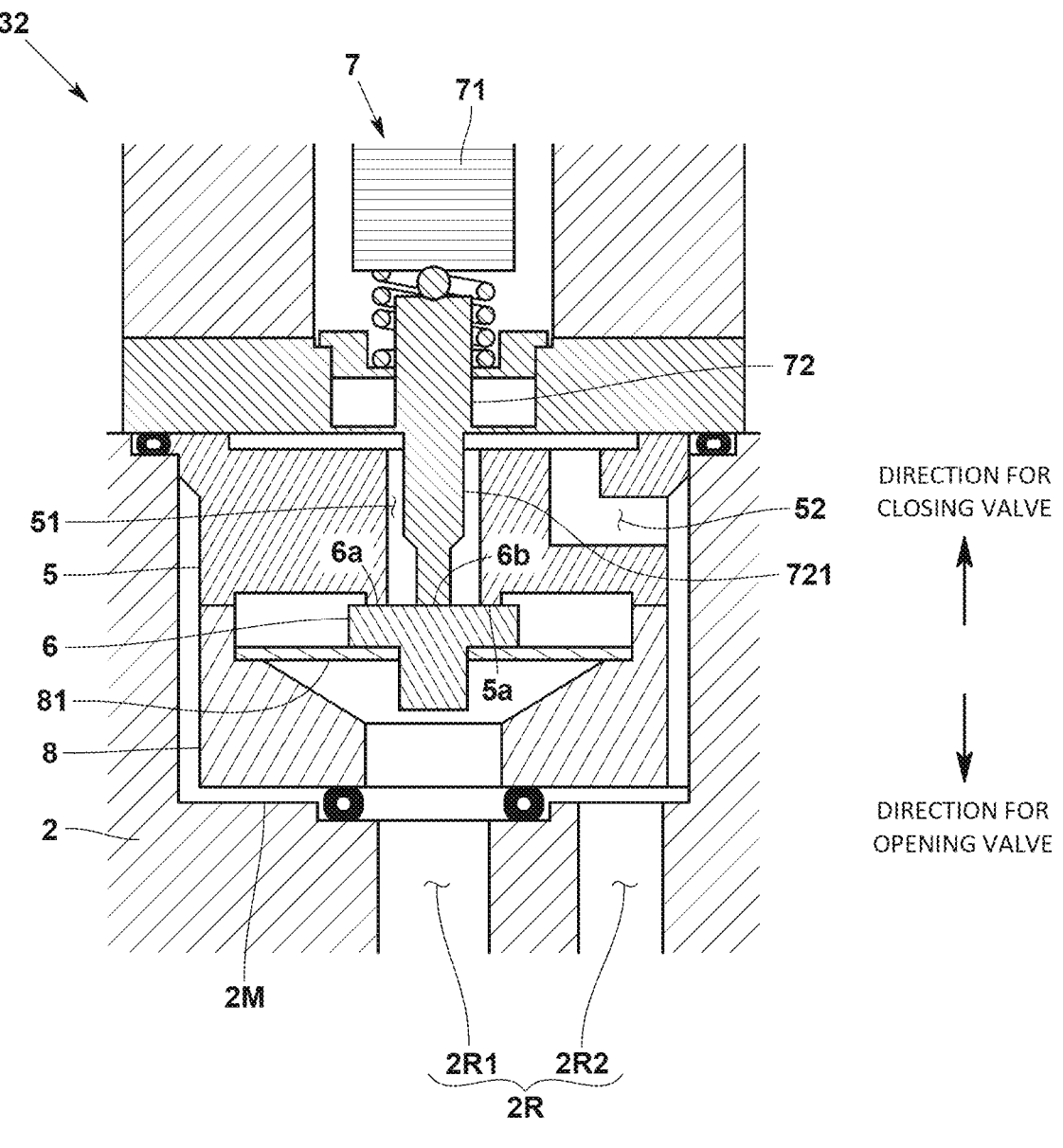
FIG. 2 is a partially enlarged cross-sectional view schematically illustrating a configuration of the fluid control valve (normally closed valve), according to the embodiment.
Figure 3:
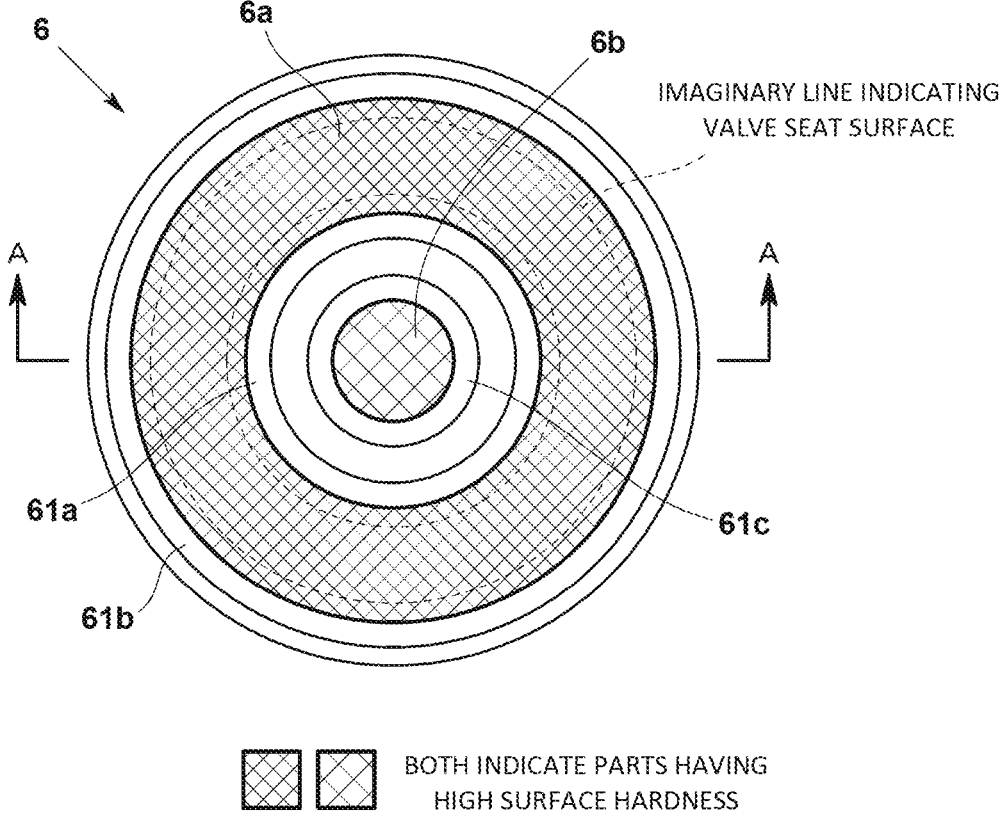
FIG. 3 is a plan view illustrating a configuration of a sitting surface of a valve plug according to the embodiment.
Figure 4:
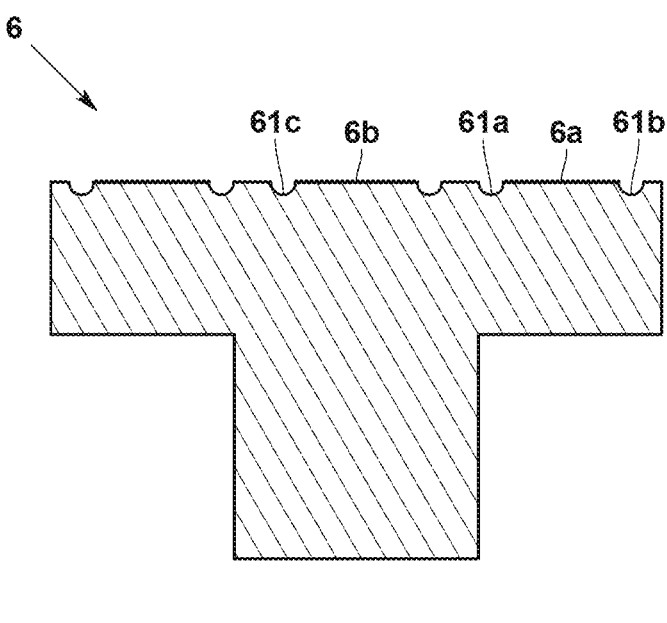
FIG. 4 is a cross-sectional view taken along line A-A of the valve plug according to the embodiment.

As illustrated in FIGS. 2 to 4, the fluid control valve 32 according to the present embodiment includes a valve seat 5 having a flat valve seat surface 5a, a valve plug 6 having a flat sitting surface 6a that comes into a surface contact with the valve seat surface 5a and sits on the valve seat surface 5a, and a driving mechanism 7 that drives the valve plug 6.

The valve seat 5 has a substantially rotating body shape, and is housed in the housing portion 2M of the channel block 2 in such a manner the outer surface of the valve seat 5 faces the downstream channel 2R2, as illustrated in FIG. 2. The valve seat 5 has an annular valve seat surface 5a on the bottom surface facing the bottom of the housing portion 2M. The valve seat 5 also has a through hole 51 penetrating the center on the inner side of the valve seat surface 5a, from the valve seat surface 5a to the side opposite to the valve seat surface 5a. The valve seat 5 also has an outlet channel 52 through which the fluid having flown into the valve seat surface 5a flows out into the downstream channel 2R2.

The valve plug 6 has a substantially rotating body shape, and is provided on the side of the bottom surface of the housing portion 2M in the channel block 2, with respect to the valve seat 5, as illustrated in FIG. 2. The valve plug 6 is supported on a support member 8 having an elastic body 81, such as a leaf spring, provided inside the housing portion 2M, and specifically, the support member 8 supports the valve plug 6, with the sitting surface 6a of the valve plug 6 facing the valve seat surface 5a. As illustrated in FIG. 3, the valve plug 6 also has an annular sitting surface 6a corresponding to the valve seat surface 5a that is also annular. The elastic body 81 exerts a biasing force to the valve plug 6 against the valve seat surface 5a, while there is no application of the driving force of the driving mechanism 7, with the sitting surface 6a sitting on the valve seat surface 5a.

As illustrated in FIG. 2, the driving mechanism 7 includes an actuator 71 such as a piezoelectric stack that is a stack of a plurality of piezoelectric elements, and a transmitting member 72 that transmits the driving force of the actuator 71 to the valve plug. The transmitting member 72 includes a plunger 721 penetrating the through hole 51 of the valve seat 5, and extending toward the valve plug 6. The plunger 721 has a distal end slightly separated from the driving force acting surface 6b of the valve plug 6 while being fully closed without the actuator 71 receiving any application of the voltage, and has the distal end in contact with the driving force acting surface 6b of the valve plug 6 while being opened, with the actuator 71 receiving the application of a voltage. The driving force acting surface 6b is provided at the center of the valve plug 6. The distal end surface of the plunger 721 has a flat shape, and is configured to come into a surface contact with the driving force acting surface 6b of the valve plug 6, also having a flat shape.

However, in the fluid control valve 32 according to the present embodiment, the first surface that is one of the valve seat surface 5a and the sitting surface 6a has a surface hardness higher than a surface hardness of the second surface that is the other one of the valve seat surface 5a and the sitting surface 6a. In the present embodiment, the first surface is the sitting surface 6a, and the second surface is the valve seat surface 5a. The surface hardness of the sitting surface 6a may be set, using the Vickers hardness of the surface, to Hv 300 to Hv 500, for example, by applying hardening processing such as burnishing processing, to the sitting surface 6a. The surface hardness of the valve seat surface 5a is Hv 200, for example. The valve seat 5 and the valve plug 6 are both made of a metal, e.g., stainless steel. As described above, in the present embodiment, the magnitude relationship between the surface hardness of the sitting surface 6a and the surface hardness of the valve seat surface 5a is defined using the surface hardness (here, Vickers hardness) that is not shape-dependent.

Specifically, as illustrated in FIG. 3, the valve plug 6 has an annular sitting surface 6a provided at a position corresponding to the annular valve seat surface 5a, on the surface facing the valve seat surface 5a. The sitting surface 6a has an area larger than the area of the valve seat surface 5a. In other words, the valve seat surface 5a is within the sitting surface 6a while the sitting surface 6a is sitting on the valve seat surface 5a.

The valve plug 6 also has the driving force acting surface 6b that is provided on the inner side of the sitting surface 6a, on the surface facing the valve seat surface 5a, and that comes into contact with the plunger 721 that is a driving member of the driving mechanism 7. The driving force acting surface 6b has a surface hardness higher than a surface hardness of a contact surface of the plunger 721 that is a driving member, the contact surface being a surface coming into contact with the valve plug 6. The driving force acting surface 6b also has a surface hardness higher than a surface hardness of the valve plug 6, in the area other than the sitting surface 6a. The surface hardness of the driving force acting surface 6b may be set to Hv 300 to Hv 500, for example, using surface hardening processing such as burnishing processing. In the present embodiment, the driving force acting surface 6b has the same surface hardness as that of the sitting surface 6a. The sitting surface 6a and the driving force acting surface 6b of the valve plug 6 are also on the same plane, so that the same surface hardness can be achieved on the sitting surface 6a and the driving force acting surface 6b through the same burnishing processing. The contact surface of the plunger 721, the contact surface coming into contact with the valve plug 6, has a surface hardness of Hv 200, for example.

Furthermore, as illustrated in FIGS. 3 and 4, the valve plug 6 also has annular grooves 61a, 61b provided adjacently to the annular sitting surface 6a. Specifically, the annular groove 61a is provided adjacently to the inner side of the annular sitting surface 6a in the radial direction, and the annular groove 61b is provided adjacently to the outer side of the annular sitting surface 6a in the radial direction. In the same manner, an annular groove 61c is provided adjacently to the driving force acting surface 6b, on the outer side of the driving force acting surface 6b in the radial direction. These grooves 61a to 61c function as clearance grooves into which the extra material pushed out in the surface hardening processing, such as burnishing processing, goes into. The groove 61a that is adjacent to the inner side of the sitting surface 6a in the radial direction and the groove 61c adjacent to the outer side of the driving force acting surface 6b in the radial direction may be the same groove.

Advantageous Effects Achieved by Embodiment

In the fluid control device 100 according to the present embodiment having the configuration described above, the sitting surface 6a has the surface hardness higher than the surface hardness of the valve seat surface 5a. With such a hardness difference between the valve seat surface 5a and the sitting surface 6a, the sealability can be improved. In addition, because the flat sitting surface 6a sits on the flat valve seat surface 5a, variations in the contact position therebetween can be tolerated. This tolerance also contributes to the improvement in the sealability. Furthermore, because both of the valve seat surface 5a and the sitting surface 6a are flat, a surface hardening processing (such as burnishing processing) for enhancing the hardness of one of these surfaces can be applied easily.

In addition, because the sitting surface 6a of the valve plug 6, which is a movable member, has the surface hardness higher than the surface hardness of the valve seat surface 5a, it is possible to reduce the chances of the sitting surface 6a becoming damaged, even if different parts of the sitting surface 6a come into contact every time the valve plug 6 comes into contact, due to variations in the contact position of the valve plug 6. Because the sitting surface 6a has an area larger than the area of the valve seat surface 5a, the sitting surface 6a is less likely to become damaged even if the edge of the valve seat surface 5a hits the sitting surface 6a, while permitting variations in the contact positions.

Other Embodiments

For example, described in the embodiment is an example in which the sitting surface 6a has the surface hardness higher than the surface hardness of the valve seat surface 5a; however, the valve seat surface 5a may have a surface hardness higher than a surface hardness of the sitting surface 6a.

In addition to the configuration according to the embodiment described above, a part of the valve plug 6, the part being in flush with the sitting surface 6a, may have a higher surface hardness, in the same manner as the sitting surface 6a.

Furthermore, it is also possible for the fluid control valve 32 according to the embodiment described above to be not only a normally closed valve, but also what is called a normally open valve that is fully open while the valve plug 6 is not driven.

Figure 5:
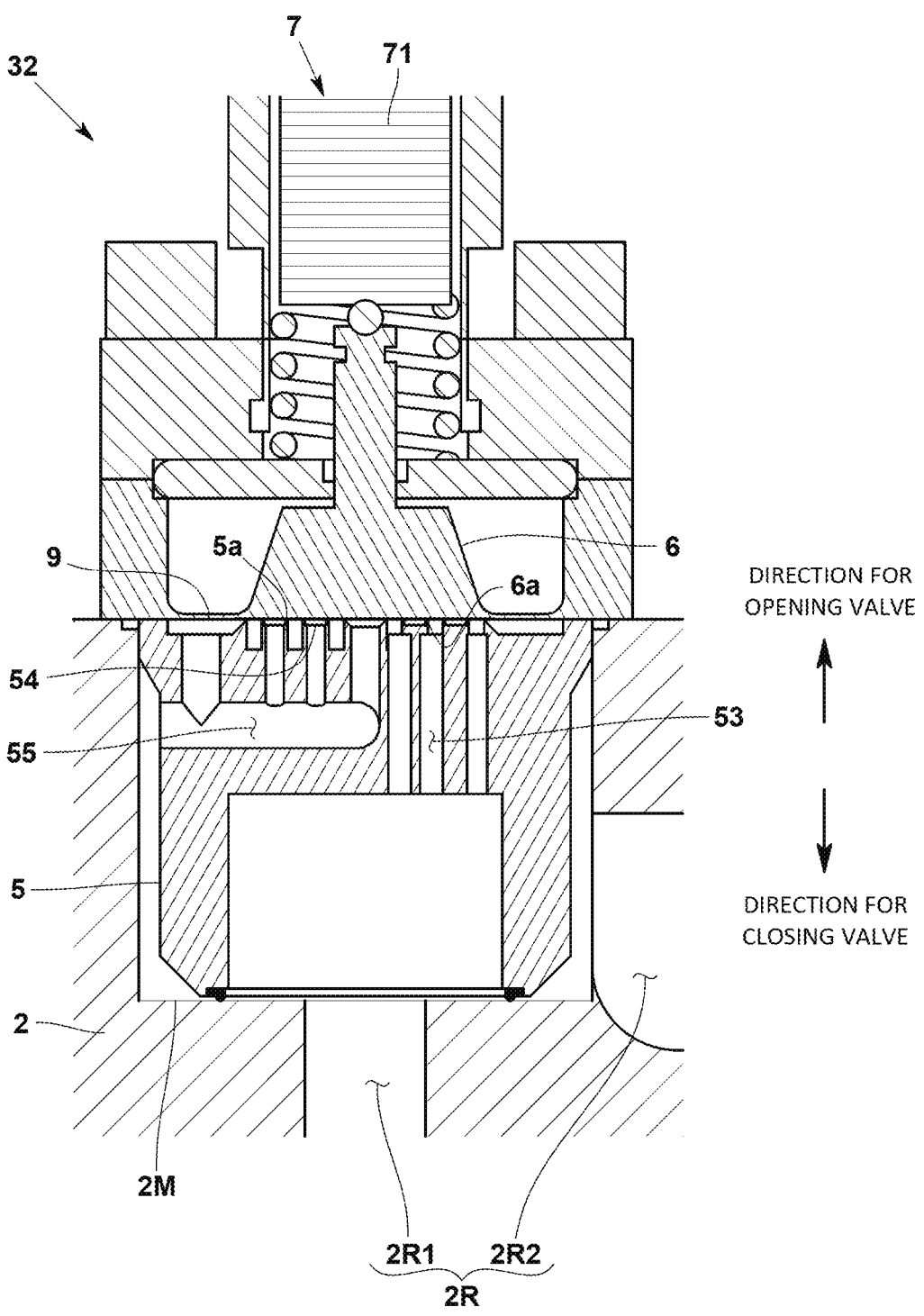
FIG. 5 is a partially enlarged cross-sectional view of a fluid control valve (normally open valve) according to a modification of the embodiment.

Specifically, as illustrated in FIG. 5, the valve seat 5 is housed in the housing portion 2M of the channel block 2, and the surface on the opposite side of the bottom surface facing the bottom of the housing portion 2M serves as the valve seat surface 5a. The valve seat 5 has a through hole 53 penetrating from the valve seat surface 5a to the bottom surface, and the through hole 53 communicates with the upstream channel 2R1. The top surface of the valve seat 5, the top surface on the opposite side of the bottom surface, has a plurality of annular bottomed grooves 54 around the through hole 53, and a communication hole 55 connecting any one of the bottomed grooves 54 and the outer surface and communicating with the downstream channel L2. The top surfaces of annular projecting stripes formed between the multiple annular bottomed grooves 54 provide the valve seat surface 5*a*.

The valve plug 6 is provided in a manner closing the housing portion 2M, and is fixed to the channel block 2 via a diaphragm portion 9. In this example, the valve plug 6 is integrated with the diaphragm portion 9. The valve plug 6 has a sitting surface 6*a* that sits on the valve seat surface 5*a*, through the elastic deformation of the diaphragm portion 9. The diaphragm portion 9 has the sitting surface 6*a* separated from the valve seat surface 5*a* while the driving force of the driving mechanism 7 is not applied thereto. The driving mechanism 7 uses an actuator 71 such as a piezoelectric stack including a stack of a plurality of piezoelectric elements.

Figure 6:
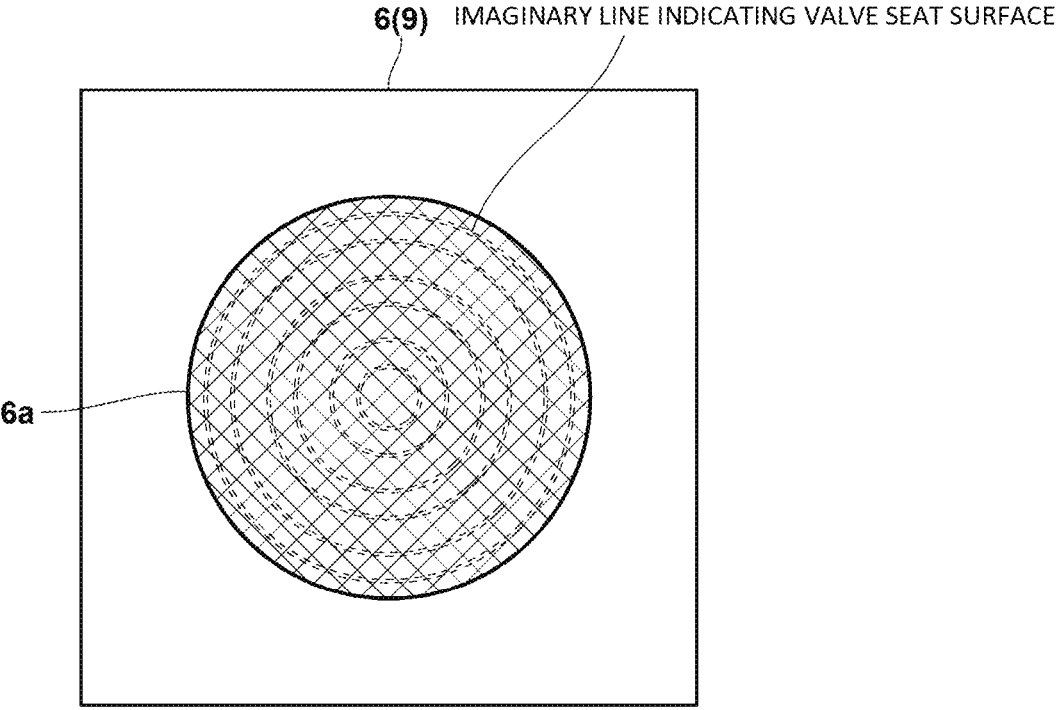
FIG. 6 is a plan view illustrating a configuration of a sitting surface of a valve plug according to the modification of the embodiment.

Even in such a case, the first surface that is one of the valve seat surface 5*a* and the sitting surface 6*a* has a surface hardness higher than a surface hardness of the second surface that is the other one of the valve seat surface 5*a* and the sitting surface 6*a*. Although FIG. 6 illustrates an example in which the sitting surface 6*a* has a surface hardness higher than a surface hardness of the valve seat surface 5*a*, the valve seat surface 5*a* may have a surface hardness higher than a surface hardness of the sitting surface 6*a*. As the surface hardening processing, burnishing processing may be used, in the same manner as in the embodiment described above.

In the embodiment described above, the fluid control valve 32 is provided upstream of the flow rate sensor 31, but may also be provided downstream of the flow rate sensor 31.

In the embodiment described above, a piezoelectric element (piezoelectric stack) is used as the actuator 71 of the driving mechanism 7, but a solenoid or the like may also be used as the actuator 71.

In the embodiment described above, a pressure flow rate sensor is used as the flow rate sensor 31 in the fluid control device 100, but a thermal flow rate sensor may also be used. In such a case, it is conceivable to install a thermal flow rate sensor upstream of the fluid control valve 32. A fluid sensor such as a pressure sensor may be used in addition to a flow rate sensor.

The fluid control device 100 is not limited to those using a pressure sensor and a thermal sensor, and may also be a configuration that uses a position sensor provided to the fluid control valve 32 so as to measure the relative position between the valve seat surface 5*a* and the sitting surface 6*a*, and configured to feedback-control the degree by which the valve is opened, on the basis of the measurement of the position sensor. Furthermore, the fluid control device according to the present invention is not limited to the flow rate control device according to the embodiment described above, and may also be applied to a pressure control device that controls the pressure of a fluid.

Any other various modifications and combinations of the embodiment are still possible within the scope not deviating from the gist of the present invention.

INDUSTRIAL APPLICABILITY

According to the present invention, it is possible to improve the sealability of a fluid control valve.

REFERENCE CHARACTERS LIST

100 fluid control device
2 channel block
2R internal channel
3 fluid controller
31 fluid sensor
32 fluid control valve
4 control unit
5 valve seat
5*a* valve seat surface
6 valve plug
6*a* sitting surface
6*b* driving force acting surface
7 driving mechanism

The invention claimed is:

1. A fluid control valve comprising:
a valve seat having a valve seat surface that is flat; and
a valve plug having a sitting surface that is flat and that sits on the valve seat surface,
wherein
the valve seat and the valve plug are both made of metal,
a first surface that is one of the valve seat surface and the sitting surface has a surface hardness higher than a surface hardness of a second surface that is the other one of the valve seat surface and the sitting surface, and
a groove is formed in a member having the first surface so as to surround the first surface.

2. The fluid control valve according to claim 1, wherein the first surface has an area larger than an area of the second surface.

3. The fluid control valve according to claim 1, wherein the first surface is the sitting surface, and the second surface is the valve seat surface.

4. The fluid control valve according to claim 3, further comprising a driving mechanism that includes a driving member that comes into contact with the valve plug and that drives the valve plug,
wherein
the valve plug has the sitting surface and a driving force acting surface that comes into contact with the driving member, and
the driving force acting surface has a surface hardness higher than a surface hardness of a contact surface of the driving member, the contact surface coming into contact with the valve plug.

5. The fluid control valve according to claim 3, wherein the valve plug has a groove provided adjacently to the sitting surface.

6. A fluid control device comprising:
the fluid control valve according to claim 1;
a fluid sensor that measures a flow rate or a pressure of a fluid; and
a control unit that controls a degree by which the fluid control valve is opened, based on a measurement measured by the fluid sensor, and based on a setting.

7. A method of manufacturing a fluid control valve including a valve seat having a valve seat surface that is flat and a valve plug having a sitting surface that is flat and that sits on the valve seat surface, wherein the valve seat and the valve plug are both made of metal, the method comprising:

forming a groove so as to surround one of the valve seat surface and the sitting surface; and applying burnishing processing to the one of the valve seat surface and the sitting surface that is surrounded by the groove, so as to make a surface hardness of the one of the valve seat surface and the sitting surface higher than a surface hardness of the other one of the valve seat surface and the sitting surface.

* * * * *